INVENTORS.
Richard J. Beaver &
Carl F. Leitten, Jr.

United States Patent Office 3,030,294
Patented Apr. 17, 1962

3,030,294
NEUTRONIC REACTOR CONTROL ELEMENT
Richard J. Beaver, Knoxville, and Carl F. Leitten, Jr., Oak Ridge, Tenn., assignors to the United States of America as represented by the United States Atomic Energy Commission
Filed Aug. 14, 1959, Ser. No. 833,896
6 Claims. (Cl. 204—193.2)

Our invention relates generally to the neutronic reactor art, and more particularly to improved control rods for neutronic reactors.

Solid-fuel thermal neutronic reactors are almost invariably controlled by the absorption of neutrons in control rods that are removably inserted into the reactor core. Neutron-absorption control is used in other types of reactors as well. A control rod usually consists of a central core, which contains the neutron absorbing material, surrounded by a protective cladding. For example, boron-aluminum alloys clad with aluminum and iron-boron alloys clad with stainless steel have been used for control purposes.

Control rods, especially the clad type, are susceptible to damage under neutron irradiation whenever a neutron absorbing material that undergoes the neutron-alpha (n, α) reaction is used. Boron-10 is the only material which undergoes the (n, α) reaction that is currently used, but because of its availability, high cross section, and relatively low cost, boron-10 presently is one of the most desirable neutron-absorbing materials. Helium is one of the products of the (n, α) reactions, and after a relatively short exposure of a boron-containing rod to neutrons, sufficient helium is liberated to severely damage the rod. The manifestation of irradiation damage of this type is a swelling or growth of the control rod. Experiments that we conducted revealed that a 97.19 wt. percent iron–2.81 wt. percent boron-10 plate clad with stainless steel increased 2.6 percent in thickness after 11.5 percent boron burnup, and 34.0 percent in thickness after 32.9 percent boron-10 burnup. Increases in thickness of these magnitudes usually renders a control rod useless for reactor service.

It is, therefore, the object of our invention to provide a boron-containing control rod having a longer operating lifetime than the lifetime of prior rods.

Figure 1:
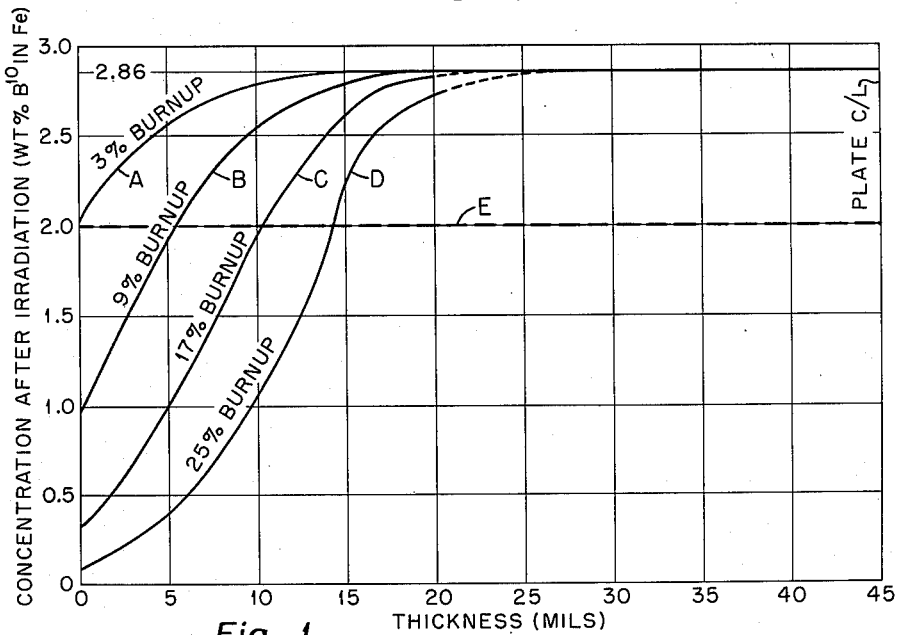
Figure 2:
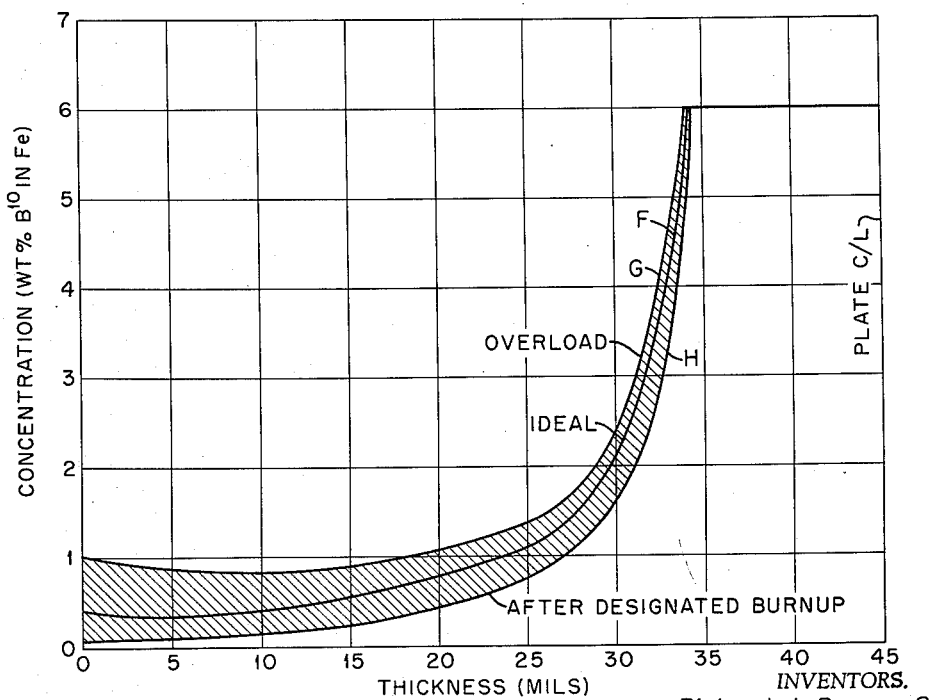

Other objects of our invention will become apparent from an examination of the following description of our invention and the drawings appended thereto, wherein:

FIGURE 1 is a graphical representation of various burnup profiles of an iron-boron dispersion containing 2.86 weight percent boron; and FIGURE 2 is a graphical representation of a boron concentration gradient which affords uniform boron burnup.

We have found, by examining irradiated samples of iron-boron dispersions clad with stainless steel, that radiation damage is largely confined to the region of the interface between the core and cladding, and that the severity of the damage is dependent on the amount of boron that is burned out in these regions during the irradiation. Radiation damage is confined to the interface region because of the confinement of absorption to this region caused by the self-shielding effect of boron.

This confinement of burnup to the interface region is illustrated by FIGURE 1, which is a graphical representation of boron-10 burnup as a function of location within the core of a control rod. FIGURE 1 is plotted for a specific core, that is, one having a thickness of 0.090 inch (only one-half of the core is shown in FIGURE 1) and an initially uniform boron-10 concentration of 2.86 weight percent, but the general principles which can be drawn therefrom are applicable to control rods of any dimension and composition. Curve A of FIGURE 1 represents the burnup profile of a control rod in which 3 percent of the initial boron-10 atoms have been burned out. In the same manner, curve B represents the 9 percent burnup profile, curve C represents the 17 percent burnup profile, and curve D, the 25 percent burnup profile. It can be seen from an examination of these curves that essentially all of the boron burnup occurs within the first 15–25 mils of the core of the control rod, and that essentially no reaction between boron-10 and neutrons occurs within the interior of the core.

From an examination of photomicrographs and from dimensional measurements of samples which we irradiated, we have observed that no damage results in iron-boron dispersions containing 2.86 wt. percent boron-10 if the total burnup is maintained at about 3 weight percent or less. FIGURE 1 reveals that for 3 weight percent total burnup, the reduction in boron-10 concentration at the interface (i.e., the intersection of the 3 percent profile with the ordinate) is .86 wt. percent, or a local burnup percent of 0.86/2.86×100=30 percent. Since no damage occurs at a reduction in boron-10 concentration of .86 wt. percent at the interface, if the burnup profile could be flattened as is indicated by the dotted line designated E on FIGURE 1, the total or overall boron-10 burnup would be increased from 3 weight percent to 30 weight percent without incurring damage. However, the self shielding effect makes the flattening of the burnup profile impossible in a core containing a uniform dispersion of boron.

In accordance with the principles of our invention, we provide a control element in which the concentration of absorber varies from a minimum at the outer surface to a maximum at the center. This concentration gradient throughout the core of the control element allows a more uniform burnup of absorber than a homogeneously dispersed absorber will afford.

Preferably the absorber is distributed in substantial compliance with the following equation:

(1) $$N = N^0 \frac{1}{1-(i-1)C/I_0}[1+\sigma I]$$

where:

$N$=number of boron atoms per cm.$^2$ of frontal area required in thickness-increment $i$ of the element;

$N^0$=number of boron atoms per cm.$^2$ of frontal area in thickness-increment 1 of the element;

$C/I_0$=probability of neutron capture in thickness-increment 1;

$I$=total number of neutrons incident on a cm.$^2$ of thickness-increment $i$ during one-half of the desired control element lifetime;

$i$=number designating the position of a thickness increment in control element, all increments having a constant thickness, and the designating number ascending by integers from the outermost increment 1 to the center of the element; and $\sigma$=absorption cross section of the absorber material.

The probability of capture of a neutron entering any increment of thickness of this control element is $C/I$, where $C$=number of neutrons absorbed in the increment and $I$=number of neutrons entering the layer. The probability is further defined by the following expression:

(2) $$\frac{C}{I} = N\sigma$$

where:

$N$=number of absorber atoms in the increment under consideration, and $\sigma$=absorption cross section of the absorber material.

For the special case of increment number 1, the probability is:

(3) $$\frac{C}{I_0} = N^0 \sigma$$

where:

$I_0$ = number of neutrons entering increment 1, and
$N^0$ = number of absorber atoms in increment 1.

Equation 1 may be written in the following form:

(4) $$N = N^0 \frac{1}{1-(i-1)C/I_0} + N^0 \frac{1}{1-(i-1)C/I_0}(\sigma I)$$

The first term on the right side of Equation 4, i.e., $$N^0 \frac{1}{1-(i-1)C/I_0}$$

can be designated $N'$ and is evaluated for a specific application in the following manner. Since the absorption cross section ($\sigma$) is essentially constant in a given control rod in a particular reactor, the probability of absorption in increment 1 ($C/I_0$) is computed from Equation 3 by assuming a value for the number of absorber atoms per cm.² in increment 1 ($N^0$). Having values for $C/I_0$ and $N^0$, a substitution thereof in the first term of Equation 4 above will allow the determination of $N'$ for each increment in the control element under consideration.

$N'$ represents the number of absorber atoms per cm.² necessary in each increment of an element to afford exactly the same degree of burnup in each increment. The results of a calculation of $N'$ for an iron-boron dispersion is represented by curve F of FIGURE 2. (In FIGURE 2, N has been converted to weight percent.) Curve F is an ideal curve since it represents the only concentration gradient which provides uniform burnup. An examination of Equation 2 will reveal that if an ideal gradient is irradiated, the probability of capture ($C/I_0$) will decrease at all points along the gradient and that the magnitude of the decrease will not be constant with respect to depth. Therefore, the gradient based on $N'$ will afford the desired uniform burnup for only an infinitesimal neutron burst.

For this reason, uniform burnup is approximated by initially providing sufficient neutron absorber so that the boron-10 concentration gradient at some portion (preferably one-half) of the life of the element coincides with the ideal gradient. The second term $$N^0 \frac{1}{1-(i-1)C/I_0}(\sigma I)$$

on the right side of Equation 4 represents the amount of boron necessary to yield the ideal gradient at midlife.

Curve G of FIGURE 2 is the complete solution of Equation 4 for an iron-boron dispersion in plate form having a total thickness of 0.090 inch, and containing the same amount of boron as a similar plate having 2.86 wt. percent boron-10 homogeneously dispersed therein. The difference between curve G and curve F is proportional to the second term of Equation 4, which considers the ideal gradient (curve F) as being irradiated by a particle which has the same probability of reaction with the absorber as the absorber has with a neutron, and which produces an absorber atom when it interacts with an absorber atom. It should be apparent that the calculation of the second term of Equation 4 is merely a burnup problem worked in reverse.

Curve H of FIGURE 2 is the concentration gradient after burnup, and is calculated by subtracting the second term on the right side of Equation 4 rather than adding as was done in the computation of the overload curve.

The advantage of dispersing an absorber as we have shown can be demonstrated by a comparison of FIGURES 1 and 2. In FIGURE 1, the amount of boron initially present in the control element is proportional to the area of the graph which lies under the horizontal line marked "2.86." The amount of boron burned is represented by the area of the graph which lies between the 2.86 line and each of the burnup profile curves.

In FIGURE 2, the amount of boron initially present is represented by the area under curve G, the overload curve, and this amount is identical to the amount present in the element for which FIGURE 1 is drawn. The amount of boron burned out of the element of FIGURE 2 is proportional to the shaded area between curve G and curve H and is approximately 20 weight percent. It will be noted that the maximum reduction in boron-10 concentration is 0.9 weight percent.

Returning to FIGURE 1, it can be seen that curve A, which represents a total burnup of 3 percent, intersects the ordinate at approximately 2.0 weight percent boron-10, or a reduction of 0.86 weight percent in the boron-10 concentration. Thus, it can be seen that for a maximum reduction in boron-10 concentration of approximately 0.9 weight percent, a plate containing a uniform dispersion of boron (FIGURE 1) can be burned out to only 3 weight percent boron-10, whereas if the concentration is varied in the manner which we provide, a burnout of approximately 20 percent can be achieved.

Fabrication of a control element having an absorber concentration gradient can be accomplished by providing a series of thin compacts or plates, each of the compacts or plates having absorber uniformly dispersed therein at concentrations which correspond to the calculated overload concentration gradient (e.g., curve G of FIGURE 2) and the position that the compact will occupy in the finished control element. For example, each half of a control element having the concentration gradient required by FIGURE 2 could be made up of the series of compacts or plates prescribed in Table I below. In the table, the outer compact or plate is number 1 and the inner compact or plate is number 11.

. Table I

| Plate number | Thickness, mils | B-10 Concentration, wt. percent |
|---|---|---|
| 1 | 15 | 0.8 |
| 2 | 5 | 1.0 |
| 3 | 5 | 1.25 |
| 4 | 2.5 | 1.50 |
| 5 | 1.25 | 1.80 |
| 6 | 1.25 | 2.20 |
| 7 | 1.0 | 2.60 |
| 8 | 1.0 | 3.30 |
| 9 | 1.0 | 4.35 |
| 10 | 1.0 | 5.40 |
| 11 | 11.0 | 6.00 |

Since control elements are usually rolled from a thick plate, each of the plates in a composite plate can be made thicker than will be desired in the finished plate, and the reduction in thickness will be accomplished in the rolling process. For example, each of the plates of Table I could be made ten times the thickness prescribed, placed together in a rolling frame, and reduced in thickness by a factor of ten by a hot rolling operation. This technique has the advantage of allowing diffusion of boron between adjacent layers, thereby more closely duplicating the desired concentration gradient.

Although our invention has been described with specific reference to an iron-boron dispersion in plate form, this fact should not be construed in a limiting sense. Many deviations from and modifications of this specific control composition may be made within the skill of the neutronic reactor art. Our invention is applicable to control elements of any configuration and composition. Any neutron absorber can be burned out uniformly if it is distributed in the manner which we prescribe, and where the absorber is an (n, α) absorber, the operating lifetime of a control element in which it is placed will be extended considerably. It is, therefore, intended that our invention be limited in scope only by the claims appended hereto.

Having thus described our invention, we claim:

1. In the absorbing portion of a neutronic reactor control element wherein a non-fissionable neutron-absorbing material which undergoes a neutron-alpha nuclear reaction is dispersed in a matrix material, the improvement which comprises the distribution of said neutron-absorbing material, prior to exposure of said element to neutrons where the concentration of said material varies transversely across said element from a minimum at the surface to a maximum at the center of said element.

2. In a neutron-absorber control element for a neutronic reactor, wherein a central core, consisting essentially of a non-fissionable neutron-absorber material which undergoes a neutron-alpha nuclear reaction dispersed in a matrix material, is surrounded by a protective cladding, an improved composite central core comprising a plurality of thin longitudinal core sections disposed between the center of said element and said protective cladding, the concentration of said absorber being uniform within each of said sections, but varying from a maximum in the innermost section to a minimum in the outermost section adjacent to said protective cladding.

3. A boron-10 containing neutronic reactor control element wherein said boron-10 is dispersed in a matrix material, characterized in that the concentration of boron-10 in said matrix varies transversely across said element from a minimum at the surface to a maximum at the center of said element prior to exposure of said element to neutrons.

4. An improved boron-10 containing neutronic reactor control element wherein said boron-10 is dispersed in a matrix material, the improvement which comprises a concentration gradient of said boron-10 in said dispersion in which said concentration gradient is, prior to exposure of said element to neutrons, substantially described by the following equation:

$$N = N^0 \frac{1}{1-(i-1)C/I_0}[1+\sigma I]$$

where:

$N$ = the number of boron atoms per cm.² of frontal area required in thickness-increment $i$ of the element;
$N^0$ = the number of boron atoms per cm.² of frontal area in thickness-increment 1 of the element;
$C/I_0$ = the probability of neutron capture in said thickness-increment 1;
$I$ = total number of neutrons incident on a cm.² of said thickness-increment $i$ during one-half of the desired control element lifetime;
$i$ = a number designating the position of a thickness increment in said control element, all increments having a constant thickness, and the designating number ascending by integers from the outermost increment 1 to the center of the element; and
$\sigma$ = the absorption cross section of the boron-10.

5. An improved boron-10 containing neutronic reactor control element having a core consisting essentially of a boron-10 containing material dispersed in a matrix wherein said core is surrounded by a protective cladding, the improvement which comprises a concentration gradient of said boron-10 containing material in said core wherein said concentration gradient is substantially described by the following equation:

$$N = N^0 \frac{1}{1-(i-1)C/I_0}[1+\sigma I]$$

where $N$ = the number of boron atoms per cm.² of frontal area required in thickness-increment $i$ of the element;
$N^0$ = the number of boron atoms per cm.² of frontal area in thickness-increment 1 of the element;
$C/I_0$ = the probability of neutron capture in said thickness-increment 1;
$I$ = total number of neutrons incident on a cm.² of said thickness-increment $i$ during one-half of the desired control element lifetime;
$i$ = a number designating the position of a thickness increment in said control element, all increments having a constant thickness, and the designating number ascending by integers from the outermost increment 1 to the center of the element; and
$\sigma$ = the absorption cross section of the boron-10.

6. In a neutron-absorber control element for a neutronic reactor, wherein a central core consisting essentially of a boron-10 containing material is dispersed in a matrix surrounded by a protective cladding, an improved central core comprising a plurality of thin longitudinal core sections disposed between the center of said element and said protective cladding, the concentration of said boron-10 containing material being uniform within each of said sections, but varying from a maximum in the innermost section to a minimum in the outermost section adjacent to said protective cladding, and being further characterized in that the number of absorber atoms in increments of thickness in each of said sections substantially complies with the equation:

$$N = N^0 \frac{1}{1-(i-1)C/I_0}[1+\sigma I]$$

where:

$N$ = the number of boron atoms per cm.² of frontal area required in thickness-increment $i$ of the element;
$N^0$ = the number of boron atoms per cm.² of frontal area in thickness-increment 1 of the element;
$C/I_0$ = the probability of neutron capture in said thickness-increment 1;
$I$ = total number of neutrons incident on a cm.² of said thickness-increment $i$ during one-half of the desired control element lifetime;
$i$ = a number designating the position of a thickness increment in said control element, all increments having a constant thickness, and the designating number ascending by integers from the outermost increment 1 to the center of the element; and
$\sigma$ = the absorption cross section of boron-10.

References Cited in the file of this patent
UNITED STATES PATENTS
2,859,163    Ploetz _____ Nov. 4, 1958

OTHER REFERENCES

Power Reactor Technology, vol. 2 (No. 2, March 1959) pages 28, 29.